United States Patent
Hiwatari

(10) Patent No.: US 6,288,506 B1
(45) Date of Patent: Sep. 11, 2001

(54) SUBMERGENCE DETECTION POWER-WINDOW APPARATUS

(75) Inventor: Minoru Hiwatari, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/575,030

(22) Filed: May 19, 2000

(30) Foreign Application Priority Data

May 21, 1999 (JP) .................................................. 11-142091

(51) Int. Cl.$^7$ ................................ H02P 7/00; B60J 1/00; B60J 1/17
(52) U.S. Cl. ........................ 318/283; 318/481; 318/483; 180/281; 307/10.1
(58) Field of Search .................................... 318/282, 283, 318/285, 286, 455–483; 307/10.1; 180/281, 282, 271

(56) References Cited

U.S. PATENT DOCUMENTS

| | | | |
|---|---|---|---|
| 4,428,250 | * | 1/1984 | Becker et al. . |
| 4,441,236 | * | 4/1984 | Bron . |
| 5,547,208 | * | 8/1996 | Chappell et al. . |
| 5,994,797 | * | 11/1999 | Yamaoka . |
| 6,031,296 | * | 2/2000 | Takagi et al. . |
| 6,060,794 | * | 5/2000 | Takagi et al. . |
| 6,072,290 | * | 6/2000 | Takagi et al. . |
| 6,081,085 | * | 6/2000 | Ohashi et al. . |
| 6,111,373 | * | 8/2000 | Ohashi . |
| 6,201,363 | * | 3/2001 | Miyazawa . |

FOREIGN PATENT DOCUMENTS

| | | |
|---|---|---|
| 7-230736 | 8/1995 | (JP) . |
| 8-203399 | 8/1996 | (JP) . |
| 11-20581-A | * 1/1999 | (JP) . |
| 11-70815-A | * 3/1999 | (JP) . |
| 11-99895-A | * 4/1999 | (JP) . |
| 2000-139516-A | * 5/2000 | (JP) . |
| 2000-328841-A | * 11/2000 | (JP) . |

* cited by examiner

*Primary Examiner*—Paul Ip
(74) *Attorney, Agent, or Firm*—Brinks Hofer Gilson & Lione

(57) ABSTRACT

A submergence detection power-window apparatus is provided with driving motors for moving electric-power driven opening units to opened and closed states, manual switches for manually opening/closing the electric-power driven opening units, control units for driving the motors into rotation in accordance with operations carried out on the manual switches, a submergence detector for detecting submergence of a car body and generating a submergence detection signal and a fastened/loosened seat-belt detector for detecting fastened/loosened states of a seat belt and generating a loosened-seat-belt detection signal in a loosened state of the seat belt wherein the control units drive the motors into rotation in directions to open the electric-power driven opening units when the manual switches are operated to open the electric-power driven opening units provided that a submergence detection signal is received from the submergence detector and a loosened-seat-belt detection signal is received from the fastened/loosened seat-belt detector.

6 Claims, 3 Drawing Sheets

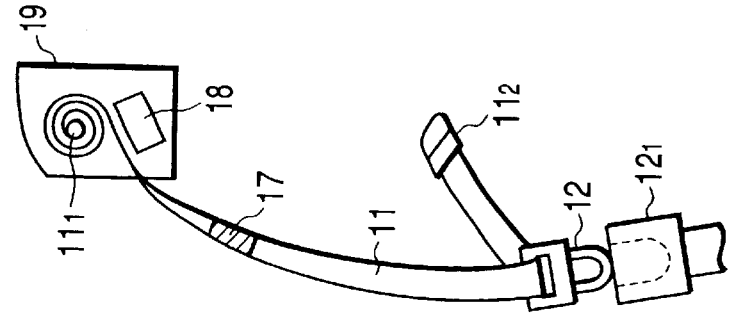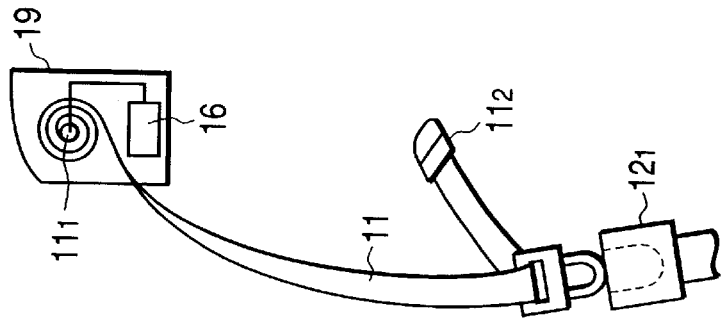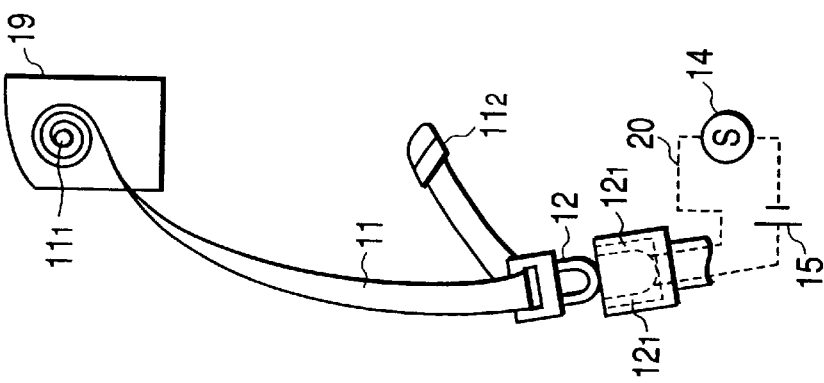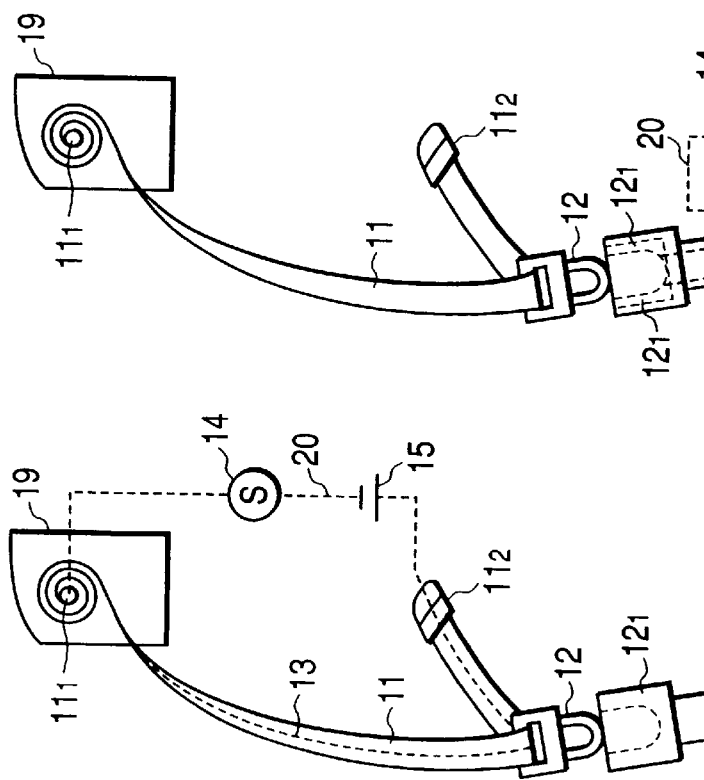

SUBMERGENCE DETECTION POWER-WINDOW APPARATUS

BACKGROUND OF THE INVENTION

1. Field of the Invention

In general, the present invention relates to a submergence detection power-window apparatus. More particularly, the present invention relates to a submergence detection power-window apparatus which allows an electrical-power driven opening unit such as a window, a sunroof or the like to open by actuation of an opening switch employed in the electrical-power driven opening unit when the car submerges under water, causing a submergence detection signal to be output provided that a seat-belt loosened-state detection signal has been activated.

2. Description of the Related Art

As commonly known, a power-window apparatus employed in a car generally comprises a window operation unit provided in a door pocket on the driver-seat side or window operation units provided in door pockets on the driver-seat side and the assistant-driver-seat side respectively. As another alternative, the power-window apparatus comprises window operation units provided in door pockets on the driver-seat side, the assistant-driver-seat side and the rear-seat sides respectively.

Each window operation unit of the commonly known power-window apparatus includes window opening/closing manual switches, a driving motor for opening and closing the window and a driving control unit. The window opening/closing manual switches are a window opening switch and a window closing switch. The driving control unit drives the driving motor in a direction according to operations of the window opening switch and the window closing switch.

When a car having such a power-window apparatus submerges underwater, causing water to flow into the inside of the car, the water also enters the door pocket containing a window operation unit. With the window operation unit submerged in the water, the water also enters the window opening switch and the window closing switch. In this state, it is difficult to maintain electrical insulation between contact points in the window opening switch and the window closing switch. Thus, the contact points are connected through a relatively small resistance of the water in spite of the fact that the switch including the contact points is open. As a result, when the window opening switch is operated later, the driving control unit of the motor associated with the window opening switch does not function normally. In consequence, the window can not be opened even if the window opening switch is operated and, accordingly, the passengers are not capable of escaping from the car submerged under the water with ease.

In order to solve the problem described above, the applicant of a patent for the present invention has recently proposed a window operation unit that is employed in a power-window apparatus, installed in a door pocket on the driver-seat side and provided with a submergence detection control circuit connected to a submergence detector having a submergence detection sensor.

In the case of the proposed power-window apparatus described above, when a car having such a power-window apparatus submerges underwater, causing water to flow into the inside of the car and also to enter the door pocket on the driver-seat side, the submergence detection sensor detects the flowing water, causing the submergence detector to generate a submergence detection signal and supply the signal to the submergence detection control circuit. At that time, even if water starts flowing into the window opening switch of the window operation unit provided on the driver-seat side, within a predetermined period following the submergence state, the submergence detection control circuit causes the motor to be driven into rotation to open the window on the driver-seat side if the window opening switch employed in the window operation unit provided on the driver-seat side is manually operated. As a result, the window on the driver-seat side can be opened to allow the passengers including the driver to get out from the submerging car.

In the case of the proposed power-window apparatus described above, when water starts flowing to the inside of the car, entering the door pocket on the driver-seat side, the submergence detection sensor of the submergence detector employed in the window operation unit provided on the driver-seat side detects the flowing water, causing the submergence detector to generate a submergence detection signal and supply the signal to the submergence detection control circuit. At that time, the window on the driver-seat side can be opened by manually operating the window opening switch employed in the window operation unit provided on the driver-seat side. On the other hand, the passenger of the car normally fastens its seat belt while the car is running so that, even after the car submerges under water, the seat belt remains fastened as it is. Thus, if the window opening switch employed in the window operation unit provided on the driver-seat side is manually operated to open the window on the driver-seat side with the passenger keeps its seat belt fastened when a car with the proposed power-window apparatus described above submerges under water and the water starts flowing to the inside of the car, a large amount of water will flow to the inside of the car through the opened window. Thus, it becomes difficult to loosen the seat belt. As a result, it is too late for the passenger to escape from the submerged car.

SUMMARY OF THE INVENTION

It is thus an object of the present invention addressing the technical problem described above to provide a submergence detection power-window apparatus which allows passengers to escape from the submerged car with ease by opening an electrical-power driven opening unit by an operation of an opening switch wherein the electrical-power driven opening unit can be opened by an operation of the opening switch only if a submergence detection signal has been generated to indicate submergence of the car and loosened states of the seat belts of the passengers are also detected as well.

In order to achieve the object described above, the submergence detection power-window apparatus provided by the present invention is equipped with: a motor for driving opening and closing operations of an electrical-power driven opening unit; a manual switch for opening and closing the electrical-power driven opening unit; a control unit for driving the motor in an operation of the manual switch for opening and closing the electrical-power driven opening unit; a submergence detector for detecting submergence of a car body and generating a submergence detection signal indicating detected submergence; and a fastened/loosened-seat-belt detector for detecting a fastened state and a loosened state of a seat belt and generating a loosened-seat-belt detection signal indicating a loosened state of the seat belt, wherein the control unit drives the motor in a direction to open the electric-power driven opening unit if an opening direction switch of the manual switch for opening and closing the electrical-power driven opening unit is operated upon reception of the submergence detection signal from the submergence detector and the loosened-seat-belt detection signal from the fastened/loosened-seat-belt detector.

According to the means described above, when a car submerges under water, causing the submergence detector to generate a submergence detection signal and supply the submergence detection signal to the control unit, and if the passenger loosens a seat belt to escape from the submerging car, causing the fastened/loosened-seat-belt detector to generate a loosened-seat-belt detection signal and supply the loosened-seat-belt detection signal to the control unit, the control unit drives the motor in a direction to open the electric-power driven opening unit in response to an operation carried out on the opening direction switch of the manual switch for opening and closing the electrical-power driven opening unit. As a result, the electric-power driven opening unit opens, allowing the passenger who has loosened the seat belt to escape from the submerging car through the opened electric-power driven opening unit safely and surely.

In a typical version of an embodiment provided by the present invention, the submergence detection power-window apparatus includes a fastened/loosened seat-belt detector which is used for generating a loosened seat-belt detection signal when a fastening unit of a seat-belt buckle is loosened.

According to this embodiment, the passenger loosens the seat belt to start opening the electric-power driven opening unit after completing preparation for escaping from the submerging car. Thus, the passenger is capable of escaping from the submerging car safely.

In a typical preferred implementation of the second means provided by the present invention, the submergence detection power-window apparatus includes a fastened/loosened seat-belt detection sensor provided in a fastened/loosened seat-belt detector provided at a seat-belt winding unit.

According to this embodiment, a loosened state of a seat belt can be detected with a high degree of accuracy.

In another typical implementation provided by the present invention, the submergence detection power-window apparatus includes a fastened/loosened seat-belt detector which generates a loosened seat-belt detection signal when the seat belt is cut.

According to this embodiment, an electric-power driven opening unit is opened when a seat belt is cut in case the seat belt can not be loosened for some reason. Thus, the passenger is capable of escaping from the submerging car.

In an implementation provided by the present invention, the electric-power driven opening unit is the window on the driver-seat side.

According to this embodiment, the opened window is the window on the driver-seat side on which the passenger is most likely sitting. Thus, the passenger is capable of escaping from the submerging car quickly.

In another implementation provided by the present invention, the electric-power driven opening unit is an electric-power driven sunroof.

According to this embodiment, the opened electric-power driven opening unit is an electric-power driven sunroof which is most likely the last component of the submerging car left above the surface of water. Thus, the passenger is capable of escaping from the submerging car surely.

BRIEF DESCRIPTION OF THE DRAWINGS

FIG. 3A is an explanatory diagram showing a first typical configuration of a fastened/loosened seat-belt detector employed in the first and second embodiments.

FIG. 3B is an explanatory diagram showing a second typical configuration of a fastened/loosened seat-belt detector employed in the first and second embodiments.

FIG. 3C is an explanatory diagram showing a third typical configuration of a fastened/loosened seat-belt detector employed in the first and second embodiments.

FIG. 3D is an explanatory diagram showing a fourth typical configuration of a fastened/loosened seat-belt detector employed in the first and second embodiments.

DESCRIPTION OF THE PREFERRED EMBODIMENTS

Some preferred embodiments of the present invention are described in detail by referring to diagrams as follows.

Figure 1:
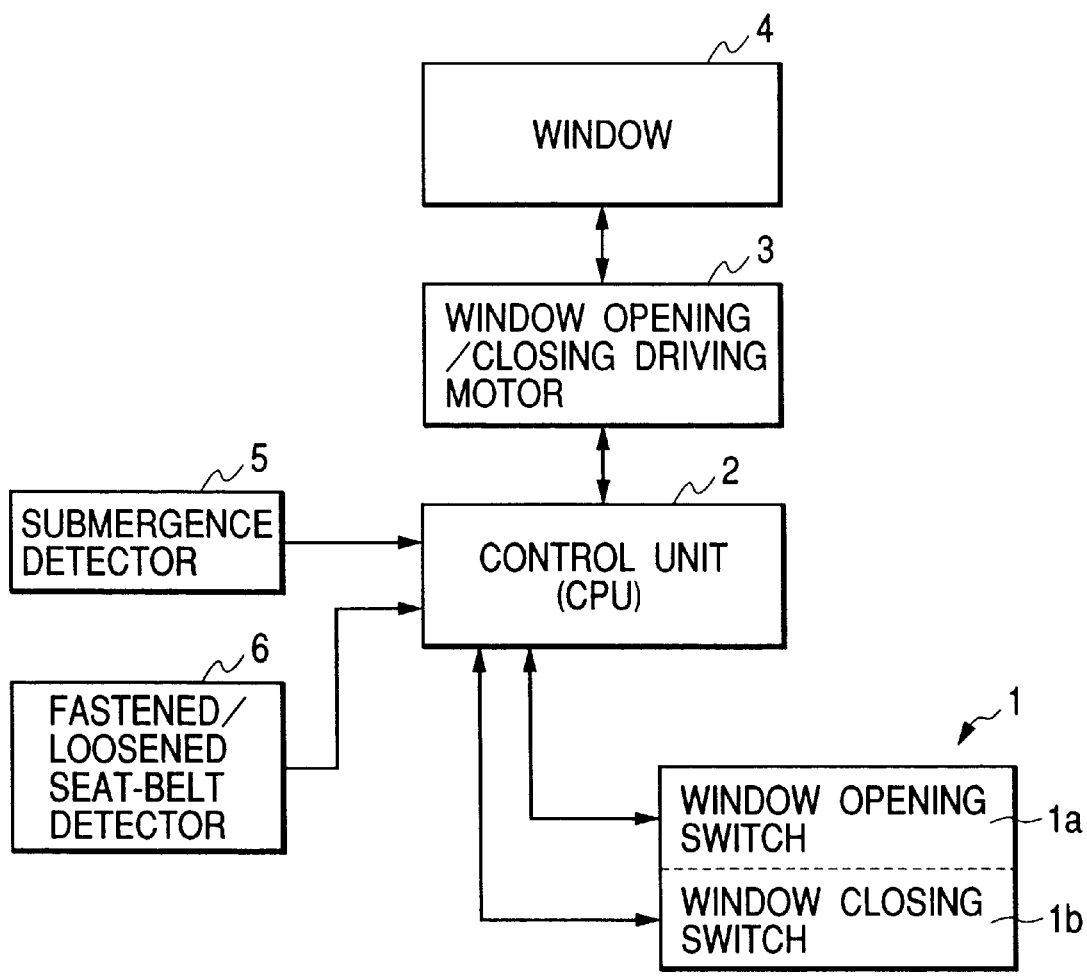
FIG. 1 is a block diagram showing the configuration of a first embodiment implementing a submergence detection power-window apparatus provided by the present invention.

FIG. 1 is a block diagram showing the configuration of a first embodiment implementing a submergence detection power-window apparatus provided by the present invention.

As shown in FIG. 1, the submergence detection power-window apparatus implemented by the first embodiment comprises a window opening/closing switch 1, a control unit (a CPU) 2, a window opening/closing driving motor 3, a window such as the driver-seat side window 4, a submergence detector 5 and a fastened/loosened seat-belt detector 6.

Connected to the control unit 2, the window opening/closing switch 1 comprises a window opening switch 1a and a window closing switch 1b. The control unit 2 is also connected to the window opening/closing driving motor 3, the submergence detector 5 and the fastened/loosened seat-belt detector 6. When the window opening switch 1a of the window opening/closing switch 1 is operated, the window opening/closing driving motor 3 is driven in response to the operation into rotation in a direction, namely, a window opening direction. When the window closing switch 1b of the window opening/closing switch 1 is operated, on the other hand, the window opening/closing driving motor 3 is driven in response to the operation into rotation in another direction, namely, a window closing direction. In addition, when a submergence detection signal generated by the submergence detector 5 and a loosened seat-belt detection generated by the fastened/loosened seat-belt detector 6 are supplied to the control unit 2, the window opening/closing driving motor 3 is driven into rotation in a direction, namely, the window opening direction, in response to an operation carried out on the window opening switch 1a employed in the window opening/closing switch 1. The window opening/closing driving motor 3 is joined to a window such as the driver-seat side window 4 by a window driving mechanism which is not shown in the figure. Thus, when the window opening/closing driving motor 3 is driven into rotation in the window opening direction, the window driving mechanism moves the driver-seat side window 4 in the opening direction. When the window opening/closing driving motor 3 is driven into rotation in the window closing direction, on the other hand, the window driving mechanism moves the driver-seat side window 4 in the closing direction. The submergence detector 5 has a submergence detection sensor which is not shown in the figure. The submergence detection sensor typically comprises a pair of mutually facing metallic plates placed at positions adjacent to each other or a pair of mutually facing metallic bars placed at positions adjacent to each other. The submergence detector 5 generates a submergence detection signal in response to a change in current flowing through the submergence detection sensor. To put it in detail, when water flowing into the inside of the car inundates the submergence detection sensor, the current of the sensor increases, exceeding a predetermined value. At that time, a submergence detection signal is generated. The fastened/loosened seat-belt detector 6 has a configuration described later, and generates a loosened-seat-belt detection signal when the seat-belt loosened state is detected.

The submergence detection power-window apparatus implemented by the first embodiment having the configuration described above operates as follows.

First of all, the following description explains an operation which is carried out when the car is in a steady state, that is, in a state of no submergence.

When a passenger operates the window opening switch 1a of the window opening/closing switch 1, the control unit 2 applies a driving voltage to the window opening/closing driving motor 3 in response to the operation of the window opening switch 1a. The driving voltage drives the window opening/closing driving motor 3 into rotation in a direction to open the driver-seat side window 4. The rotation of the window opening/closing driving motor 3 driven in this direction is propagated to the driver-seat side window 4 through the window driving mechanism. As a result of the operation, the driver-seat side window 4 is moved in the opening direction. When a passenger operates the window closing switch 1b of the window opening/closing switch 1, the control unit 2 also applies a driving voltage to the window opening/closing driving motor 3 in response to the operation of the window closing switch 1b. However, the driving voltage drives the window opening/closing driving motor 3 into rotation in another direction to close the driver-seat side window 4. The rotation of the window opening/closing driving motor 3 driven in this other direction is propagated to the driver-seat side window 4 through the window driving mechanism. As a result of the operation, the driver-seat side window 4 is moved in the closing direction. In the former case, the operation to open the driver-seat side window 4 is carried out continuously as long as the window opening switch 1a of the window opening/closing switch 1 is being operated. Similarly, in the latter case, the operation to close the driver-seat side window 4 is carried out continuously as long as the window closing switch 1b of the window opening/closing switch 1 is being operated.

Next, the following description explains an operation which is carried out when a car submerges under water, causing water to flow into the inside of the car.

When a car submerges under water, causing water to flow into the inside of the car, the water also enters the door pocket on the driver-seat side, inundating the submergence detection sensor employed in the submergence detector 5 provided inside the door pocket on the driver-seat side. The introduction of the water raises the current of the submergence detection sensor to a level higher than a predetermined value, causing the submergence detector 5 to generate a submergence detection signal and supply the submergence detection signal to the control unit 2. Receiving the submergence detection signal, the control unit 2 applies a voltage generated by a battery serving as a power supply of the car to the window opening/closing driving motor 3. It should be noted that the battery itself is not shown in the figure. In this way, the driver-seat side window 4 can be kept in a halted state in a stable manner instead of moving the window 4 in an uncontrolled manner due to a malfunction of the window opening/closing driving motor 3 even if a circuit including the window opening/closing switch 1 is partially short-circuited. In the conventional technology proposed earlier by the inventor of a patent for the present invention, when the window opening switch 1a is operated in this state, only the voltage of the power supply applied to the window opening/closing driving motor 3 to move the driver-seat side window 4 in the opening direction is sustained while the voltage of the power supply applied to the window opening/closing driving motor 3 to move the driver-seat side window 4 in the closing direction is removed. As a result, the window opening/closing driving motor 3 moves the driver-seat side window 4 in the opening direction. In the case of the present invention, however, when a submergence detection signal is received from the submergence detector 5 but no loosened seat-belt detection signal is received from the fastened/loosened seat-belt detector 6, an operation of the window opening/closing switch 1 is made ineffective at the same time as the control described above.

When the passenger loosens or unlocks its seat belt in order to escape from the submerging car, the loosened seat-belt detection sensor detects a loosened state of the seat belt, causing the fastened/loosened seat-belt detector 6 to generate a loosened-seat-belt detection signal and supply the loosened-seat-belt detection signal to the control unit 2. Receiving the supplied loosened-seat-belt detection signal, the control unit 2 makes an operation of the window opening/closing switch 1 effective. Thus, when the passenger operates the window opening switch 1a of the window opening/closing switch 1 to open the driver-seat side window 4 at that time, the control unit 2 applies a driving voltage to the window opening/closing driving motor 3 in response to the operation of the window opening switch 1a in the same way as the process to open the driver-seat side window 4 in the no-submergence state. The driving voltage drives the window opening/closing driving motor 3 into rotation in a direction to open the driver-seat side window 4. The force to drive the window opening/closing driving motor 3 into rotation in a direction to open the driver-seat side window 4 is propagated to the driver-seat side window 4 through the window driving mechanism. As a result, the driver-seat side window 4 is moved in the opening direction.

It should be noted that, if the seat belt has already been loosened when the submergence detector 5 detects submergence of the car, the control unit 2 receives a submergence detection signal and the loosened seat-belt detection signal at the same time. In this case, the driver-seat side window 4 can be closed or opened immediately by operating the window opening/closing switch 1.

As described above, according to the submergence detection power-window apparatus implemented by the first embodiment, when a car submerges under water, causing the submergence detector 5 to generate a submergence detection signal and supply the submergence detection signal to the control unit 2, and if the fastened/loosened-seat-belt detector 6 generates a loosened-seat-belt detection signal and supplies the loosened-seat-belt detection signal to the control unit 2, the control unit 2 drives the window opening/closing driving motor 3 into rotation to open the driver-seat side window 4 in response to the operation of the window opening switch 1a of the window opening/closing switch 1. As a result, the driver-seat side window 4 is opened, allowing the passenger to escape from the submerging car through the opened driver-seat side window 4 safely and surely.

As described above, in the first embodiment, the electric-power driven opening unit is exemplified by the driver-seat side window 4. It should be noted, however, that the electric-power driven opening unit does not have to be the driver-seat side window 4. For example, the electric-power driven opening unit can be an electric-power driven sunroof or a window other than the driver-seat side window 4. The electric-power driven sunroof can be used as the electric-power driven opening unit to exhibit an effect of providing passengers with a longer time to escape from the submerging car before the car submerges under water completely. This is because it is quite within the bounds of probability that the roof of the submerging car is a portion of the car to submerge under water last.

Figure 2:
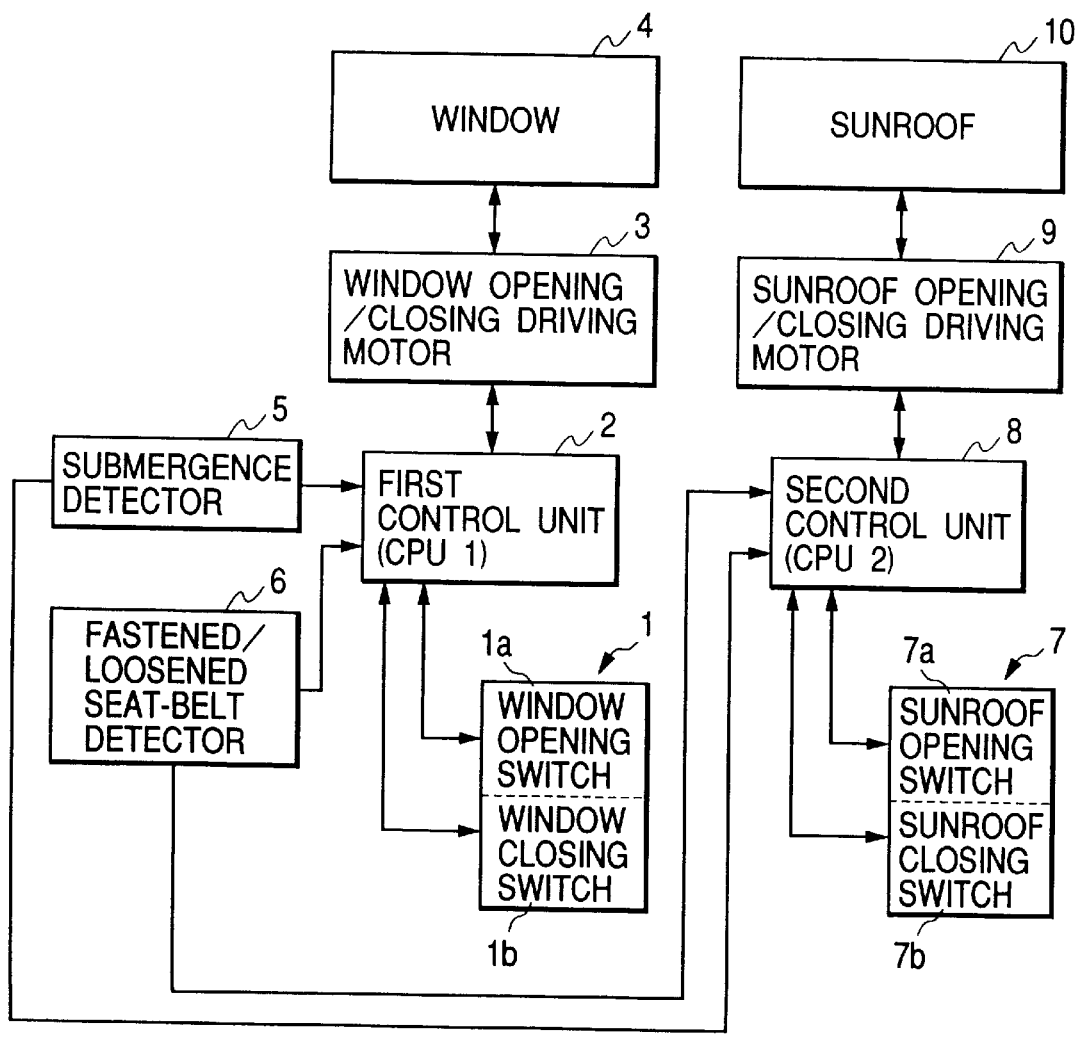
FIG. 2 is a block diagram showing the configuration of a second embodiment implementing a submergence detection power-window apparatus provided by the present invention.

FIG. 2 is a block diagram showing the configuration of a second embodiment implementing a submergence detection power-window apparatus provided by the present invention.

As shown in FIG. 2, the power-window apparatus implemented by the second embodiment comprises a sunroof opening/closing switch 7, a second control unit (a second CPU) 8, a sunroof opening/closing driving motor 9 and an electric-power driven sunroof 10 in addition to the configuration elements employed in the first embodiment. In the second embodiment, the control unit 2 employed in the first embodiment is referred to as a first control unit (a first CPU) 2 for the sake of convenience. The other configuration elements of the first embodiment which are employed in the first embodiment are denoted by the same reference numerals as those used in the first embodiment.

Connected to the second control unit 8, the sunroof opening/closing switch 7 comprises a sunroof opening switch 7a and a sunroof closing switch 7b. The second control unit 8 is also connected to the first control unit 2, the sunroof opening/closing driving motor 9, the submergence detector 5 and the fastened/loosened seat belt detector 6. When the sunroof opening switch 7a of the sunroof opening/closing switch 7 is operated, the sunroof opening/closing driving motor 9 is driven in response to the operation into rotation in a direction, namely, a sunroof opening direction. When the sunroof closing switch 7b of the sunroof opening/closing switch 7 is operated, on the other hand, the sunroof opening/closing driving motor 9 is driven in response to the operation into rotation in another direction, namely, a sunroof closing direction. In response to the submergence detection signal from the submergence detector 5 and the loosened-seat-belt detection signal from the fastened/loosened seat belt detector 6 which are supplied at the same time, the first control unit 2 applies a driving voltage to the window opening/closing driving motor 3 to drive the window opening/closing driving motor 3 into rotation in a direction to open the driver-seat side window 4 if the window opening switch 1a of the window opening/closing switch 1 is operated. The force to drive the window opening/closing driving motor 3 into rotation in a direction to open the driver-seat side window 4 is propagated to the driver-seat side window 4 through the window driving mechanism. As a result, the driver-seat side window 4 is moved in the opening direction. Similarly, in response to the submergence detection signal and the loosened-seat-belt detection signal which are supplied at the same time, the second control unit 8 applies a driving voltage to the sunroof opening/closing driving motor 9 to drive the sunroof opening/closing driving motor 9 into rotation in a direction to open the electric-power driven sunroof 10 if the sunroof opening switch 7a of the window opening/closing switch 7 is operated. The sunroof opening/closing driving motor 9 is joined to the electric-motor driven sunroof 10 by a sunroof driving mechanism which is not shown in the figure. Thus, when the sunroof opening/closing driving motor 9 is driven into rotation in the sunroof opening direction, the sunroof driving mechanism moves the electric-power driven sunroof 10 in the opening direction. When the sunroof opening/closing driving motor 9 is driven into rotation in the sunroof closing direction, on the other hand, the sunroof driving mechanism moves the electric-power driven sunroof 10 in the closing direction.

The submergence detection power-sunroof apparatus implemented by the second embodiment having the configuration described above operates as follows.

First of all, the following description explains an operation which is carried out when the car is in a steady state, that is, in a state of no submergence.

It should be noted that, in the steady state, operations are carried out by the first control unit 2, the window opening/closing driving motor 3 and the driver-seat side window 4 in the same way as the first embodiment described earlier in response to an operation performed by the passenger on the window opening switch 1a and the window closing switch 1b of the window opening/closing switch 1. Thus, it is not necessary to repeat the explanation of the operations. The following description therefore explains only operations carried out by the second control unit 8, the sunroof opening/closing driving motor 9 and the electric-power driven sunroof 10 when the sunroof opening switch 7a or the sunroof opening switch 7b of the sunroof opening/closing switch 7 is operated.

When a passenger operates the sunroof opening switch 7a of the sunroof opening/closing switch 7, the second control unit 8 applies a driving voltage to the sunroof opening/closing driving motor 9 in response to the operation of the sunroof opening switch 7a. The driving voltage drives the sunroof opening/closing driving motor 9 into rotation in a direction to open the electric-power driven sunroof 10. The rotation of the sunroof opening/closing driving motor 9 driven in this direction is propagated to the electric-power driven sunroof 10 through the sunroof driving mechanism. As a result of the operation, the electric-power driven sunroof 10 is moved in the opening direction. When a passenger operates the sunroof closing switch 7b of the sunroof opening/closing switch 7, the second control unit 8 also applies a driving voltage to the sunroof opening/closing driving motor 9 in response to the operation of the sunroof closing switch 7b. However, the driving voltage drives the sunroof opening/closing driving motor 9 into rotation in another direction to close the electric-power driven sunroof 10. The rotation of the sunroof opening/closing driving motor 9 driven in this other direction is propagated to the electric-power driven sunroof 10 through the sunroof driving mechanism. As a result of the operation, the electric-power driven sunroof 10 is moved in the closing direction.

Next, the following description explains an operation which is carried out when a car submerges under water, causing water to flow into the inside of the car.

It should be noted that operations in the case of submergence are carried out by the window opening/closing switch 1, the first control unit 2, the window opening/closing driving motor 3, the driver-seat side window 4, the submergence detector 5, and the fastened/loosened seat-belt detector 6 in the same way as the first embodiment described earlier. Thus, it is not necessary to repeat the explanation of the operations. The following description therefore explains only operations carried out by the submergence detector 5, the fastened/loosened seat-belt detector 6, the sunroof opening/closing switch 7, the second control unit 8, the sunroof opening/closing driving motor 9 and the electric-power driven sunroof 10.

When the car submerges under water, the submergence detection sensor detects the submergence, causing the submergence detector 5 to generate a submergence detection signal and supply the submergence detection signal to the first control unit 2 and the second control unit 8. At that time, the passenger loosens or unlocks its seat belt in order to escape from the submerging car. When the passenger loosens or unlocks its seat belt, the loosened seat-belt detection sensor detects a loosened state of the seat belt, causing the fastened/loosened seat-belt detector 6 to generate a loosened-seat-belt detection signal and supply the loosened-seat-belt detection signal to the first control unit 2 and the second control unit 8. At that time, when the passenger operates the sunroof opening switch 7a of the sunroof opening/closing switch 7, the second control unit 8 applies a driving voltage to the sunroof opening/closing driving motor 9 to drive the sunroof opening/closing driving motor 9 into rotation in a direction to open the electric-power driven sunroof 10 in response to the operation carried out on the sunroof opening switch 7a. The force to drive the electric-power driven sunroof 10 into rotation in a direction to open the electric-power driven sunroof 10 is propagated to the electric-power driven sunroof 10 through the sunroof driving mechanism. As a result, the electric-power driven sunroof 10 is moved in the opening direction.

When a car submerges under water, causing the submergence detector 5 to generate a submergence detection signal and supply the submergence detection signal to the first control unit 2 and the second control unit 8, and if the passenger also loosens a seat belt to escape from the submerging car, causing the fastened/loosened-seat-belt detector 6 to generate a loosened-seat-belt detection signal and supply the loosened-seat-belt detection signal to the first control unit 2 and the second control unit 8 at the same time as the submergence detection signal, the driver-seat side window 4 can be opened by the first control unit 2 in accordance with an operation carried out on the window opening switch 1a of the window opening/closing switch 1, or the electric-power driven sunroof 10 can be opened by the second control unit 8 in accordance with an operation carried out on the sunroof opening switch 7a of the sunroof opening/closing switch 7. As an alternative, the driver-seat side window 4 can be opened by the first control unit 2 in accordance with an operation carried out on the window opening switch 1a of the window opening/closing switch 1 while the electric-power driven sunroof 10 is opened by the second control unit 8 in accordance with an operation carried out on the sunroof opening switch 7a of the sunroof opening/closing switch 7. As another alternative, the posture of the submerged car detected by the first control unit 2 and the second control unit 8 determines an electric-power driven opening unit to be opened in accordance with an operation carried out on the window opening switch 1a of the window opening/closing switch 1 or an operation carried out on the sunroof opening switch 7a of the sunroof opening/closing switch 7, that is, selects the driver-seat side window 4 or the electric-power driven sunroof 10 which allows passengers to escape safely.

As described above, according to the submergence detection power-sunroof apparatus implemented by the second embodiment, when the car submerges under water, causing the submergence detector 5 to generate a submergence detection signal and supply the submergence detection signal to the first control unit 2 and the second control unit 8, and if the passenger also loosens a seat belt to escape from the submerging car, causing the fastened/loosened-seat-belt detector 6 to generate a loosened-seat-belt detection signal and supply the loosened-seat-belt detection signal to the first control unit 2 and the second control unit 8 at the same time as the submergence detection signal, the driver-seat side window 4 can be opened by an operation carried out on the window opening switch 1a of the window opening/closing switch 1, and/or the electric-power driven sunroof 10 can be opened by an operation carried out on the sunroof opening switch 7a of the sunroof opening/closing switch 7. As a result, the driver-seat side window 4 and/or the electric-power driven sunroof 10 are opened, allowing the passenger to escape from the submerging car through the opened driver-seat side window 4 and/or the opened electric-power driven sunroof 10 safely and quickly.

In this case, the driver-seat side window 4 and the electric-power driven sunroof 10 can be opened at the same time to exhibit an effect of providing a plurality of escape routes to passengers. As an alternative, only the electric-power driven sunroof 10 can be opened to exhibit an effect of providing passengers with a longer time to escape from the submerging car before the car submerges under water completely. This is because it is quite within the bounds of probability that the roof of the submerging car is a portion of the car to submerge under water last.

FIGS. 3A, 3B, 3C and 3D are explanatory diagrams showing respectively 4 types of the fastened/loosened seat-belt detector 6 employed in the first and second embodiments.

In FIGS. 3A to 3D, reference numerals 11 and $11_1$ denote a seat belt and a seat belt winder respectively. Reference numeral $11_2$ denotes the seat-belt fixed other end and reference numeral 12 denotes a seat-belt buckle. Reference numerals $12_1$ and 13 denote a buckle receptacle and a conductor lead respectively. Reference numeral 14 denotes a direct-current value detection unit and reference numeral 15 denotes a direct-current power supply. Reference numerals 16 and 17 denote a rotational-speed detection unit and a covered metallic body respectively. Reference numeral 18 denotes a metal detection unit and reference numeral 19 denotes a seat-belt accommodation unit. Reference numeral 20 denotes an external connection conductor lead.

In the case of the fastened/loosened seat-belt detector 6 of the first type shown in FIG. 3A, the conductor lead 13 is embedded in the seat belt 11. The ends of the seat belt 11 are electrically connected to the seat-belt winder $11_1$ and the seat-belt fixed other end $11_2$ respectively. The direct-current power supply 15 and the direct-current value detection unit 14 are connected in series by the external connection conductor lead 20 between the seat-belt winder $11_1$ and the seat-belt fixed other end $11_2$. The seat-belt buckle 12 and the seat-belt fixed other end $11_2$ constitute a fastened/loosened seat-belt detection sensor.

In the case of the fastened/loosened seat-belt detector 6 of the second type shown in FIG. 3B, the buckle receptacle $12_1$ is divided in transversal direction into 2 portions. The direct-current power supply 15 and the direct-current value detection unit 14 are connected in series by the external connection conductor lead 20 between the 2 portions of the buckle receptacle $12_1$. The seat-belt buckle 12 and the 2 portions of the buckle receptacle $12_1$ constitute a fastened/loosened seat-belt detection sensor.

In the case of the fastened/loosened seat-belt detector 6 of the third type shown in FIG. 3C, the rotational-speed detection unit 16 is joined to the seat-belt winder $11_1$. The rotational-speed detection unit 16 and the seat-belt winder $11_1$ constitute a fastened/loosened seat-belt detection sensor.

In the case of the fastened/loosened seat-belt detector 6 of the fourth type shown in FIG. 3D, the covered metallic body 17 is provided on the seat belt 11 at a position separated away from the seat-belt buckle 12 in such a way that, when the seat belt 11 is fastened, the covered metallic body 17 is placed outside the seat-belt accommodation unit 19 and, when the seat belt 11 is loosened, on the other hand, the covered metallic body 17 is positioned inside the seat-belt accommodation unit 19, being covered by the metal detection unit 18. When the seat belt 11 is loosened, the covered metallic body 17 is brought to the inside of the seat-belt accommodation unit 19 at a position adjacent to and facing the metal detection unit 18. The covered metallic body 17 and the metal detection unit 18 constitute a fastened/loosened seat-belt detection sensor.

In the case of the fastened/loosened seat-belt detector 6 of the first type, the seat-belt buckle 12, the buckle receptacle $12_1$, the conductor lead 13, the direct-current value detection unit 14, the direct-current power supply 15 and the external connection conductor lead 20 form a current close loop and the direct-current value detection unit 14 detects a flow of current flowing through the loop as long as the seat belt 11 is not disengaged. At that time, the fastened/loosened seat-belt detector 6 does not generate a loosened seat-belt detection signal. When the seat belt 11 is disengaged, however, the current close loop formed by the seat-belt buckle 12, the seat-belt fixed other end $11_2$, the conductor lead 13, the direct-current value detection unit 14, the direct-current power supply 15 and the external connection conductor lead 20 is broken and the direct-current value detection unit 14 thus does not detect a flow of current. At that time, the fastened/loosened seat-belt detector 6 generates a loosened seat-belt detection signal to indicate that the passenger has disengaged the seat belt 11.

In the case of the fastened/loosened seat-belt detector 6 of the second type, the 2 portions of the buckle receptacle $12_1$, the direct-current value detection unit 14, the direct-current power supply 15 and the external connection conductor lead 20 form a current close loop and the direct-current value detection unit 14 detects a flow of current as long as the seat-belt buckle 12 is engaged with the receptacle $12_1$, that is, as long as the passenger keeps the seat belt 11 fastened. At that time, the fastened/loosened seat-belt detector 6 does not generate a loosened seat-belt detection signal. If the seat-belt buckle 12 is disengaged from the receptacle $12_1$, on the other hand, the current close loop formed by the 2 portions of the buckle receptacle $12_1$, the direct-current value detection unit 14, the direct-current power supply 15 and the external connection conductor lead 20 is broken and the direct-current value detection unit 14 thus does not detect a flow of current. At that time, the fastened/loosened seat-belt detector 6 generates a loosened seat-belt detection signal.

In the case of the fastened/loosened seat-belt detector 6 of the third type, the seat belt 11 is not wound around the seat-belt winder $11_1$ as long as the seat-belt buckle 12 is engaged with the receptacle $12_1$. Thus, the rotational-speed detection unit 16 does not detects a rotational speed of the seat-belt winder $11_1$. At that time, the fastened/loosened seat-belt detector 6 does not generate a loosened seat-belt detection signal, indicating that the passenger keeps the seat-belt 11 fastened. If the the seat-belt buckle 12 is disengaged from the receptacle $12_1$ or the seat belt 11 is cut, on the other hand, the seat belt 11 is wound around the seat-belt winder $11_1$, causing the rotational-speed detection unit 16 to detect a rotational speed of the seat-belt winder $11_1$. At that time, the fastened/loosened seat-belt detector 6 generates a loosened seat-belt detection signal, indicating that the passenger has loosened the seat belt 11.

In the case of the fastened/loosened seat-belt detector 6 of the fourth type, the seat belt 11 is not wound around the seat-belt winder $11_1$ as long as the seat-belt buckle 12 is engaged with the receptacle $12_1$. Thus, the covered metallic body 17 veiled by the seat belt 11 is not detected by the metal detection unit 18. At that time, the fastened/loosened seat-belt detector 6 does not generate a loosened seat-belt detection signal, indicating that the passenger keeps the seat belt 11 fastened. If the seat-belt buckle 12 is disengaged from the receptacle $12_1$ or the seat belt 11 is cut, on the other hand, the seat belt 11 gets wound around seat-belt winder $11_1$, causing the metal detection unit 18 to detect the covered metallic body 17 on the seat belt 11. At that time, the fastened/loosened seat-belt detector 6 generates a loosened seat-belt detection signal, indicating that the passenger loosened the seat belt 11.

A loosened seat-belt detector 6 of any appropriate one of the first to fourth types can be selected for the first or second embodiment.

What is claimed is:

1. A submergence detection power-window apparatus, comprising:

a motor to drive opening and closing operations of an electrical-power driven opening unit;

a manual switch to open and close the electrical-power driven opening unit;

a control unit to drive the motor in response to an operation of the manual switch to open and close the electrical-power driven opening unit;

a submergence detector to detect submergence of a car body and generate a submergence detection signal indicating detected submergence; and a fastened/loosened-seat-belt detector to detect a fastened state and a loosened state of a seat belt and generate a loosened-seat-belt detection signal indicating a loosened state of the seat belt, wherein the control unit drives the motor in a direction to open the electric-power driven opening unit when an opening direction switch of the manual switch to open and close the electrical-driven opening unit upon reception of the submetgence detection signal from the submergence detector and the loosened-seat-belt detection signal from the fastened/loosened-seat-belt detector.

2. A submergence detection power-window apparatus according to claim 1, wherein the fastened/loosened-seat-belt detector generates a loosened-seat-belt detection signal when a fastening unit of a seat-belt buckle is loosened.

3. A submergence detection power-window apparatus according to claim 2, wherein the fastened/loosened-seat-belt detector has a fastened/loosened-seat-belt detection sensor provided on a seat-belt winding unit.

4. A submergence detection power-window apparatus according to claim 1, wherein the fastened/loosened-seat-belt detector generates a loosened-seat-belt detection signal when the seat belt is disengaged.

5. A submergence detection power-window apparatus according to claim 1, wherein the electric-power driven opening unit is a window on a driver-seat side.

6. A submergence detection power-window apparatus according to claim 1, wherein the electric-power driven opening unit is a window on a driver-seat side and an electric-power driven sunroof.

* * * * *

UNITED STATES PATENT AND TRADEMARK OFFICE
CERTIFICATE OF CORRECTION

PATENT NO. : 6,288,506 B1　　　　　　　　　　　　　　　　　　Page 1 of 1
DATED       : September 11, 2001
INVENTOR(S) : Minoru Hiwatari It is certified that error appears in the above-identified patent and that said Letters Patent is hereby corrected as shown below:

<u>Column 12,</u>
Line 36, insert -- to -- before "generate a".
Line 43, delete "submetgence" and substitute -- submergence -- in its place.

Signed and Sealed this

Twenty-eighth Day of May, 2002

Attest:

*Attesting Officer*

JAMES E. ROGAN
*Director of the United States Patent and Trademark Office*